United States Patent

[11] 3,627,974

[72] Inventors Neil J. Normando
Livingston;
Willis C. Pierce, Jr., Murray Hill, both of N.J.
[21] Appl. No. 823,304
[22] Filed May 9, 1969
[45] Patented Dec. 14, 1971
[73] Assignee Air Reduction Company, Incorporated
New York, N.Y.

[54] AVOIDANCE OF CURRENT INTERFERENCE IN CONSUMABLE CONTACT HOT WIRE ARC WELDING
4 Claims, 6 Drawing Figs.

[52] U.S. Cl. .................................................. 219/131 R, 219/137
[51] Int. Cl. ................................................... B23k 9/10
[50] Field of Search ........................................... 219/131, 137, 135, 73, 76, 130

[56] References Cited
UNITED STATES PATENTS

| | | | |
|---|---|---|---|
| 3,163,743 | 12/1964 | Wroeh et al. | 219/137 |
| 3,274,371 | 9/1966 | Manz et al. | 219/137 |
| 2,655,586 | 10/1953 | Schreiner et al. | 219/73 |
| 2,673,915 | 3/1954 | Steinert et al. | 219/131 |
| 2,868,954 | 1/1959 | Skinner et al. | 219/130 |
| 2,578,846 | 12/1951 | Segal | 219/131 X |
| 2,777,047 | 1/1957 | Stevens, Jr. | 219/131 |
| 3,020,448 | 2/1962 | Fefer | 219/131 X |
| 3,114,829 | 12/1963 | Libby | 219/137 X |
| 3,299,249 | 1/1967 | Sciaky | 219/131 |
| 3,391,268 | 7/1968 | Libby et al. | 219/135 X |

FOREIGN PATENTS

| | | | |
|---|---|---|---|
| 1,106,977 | 7/1955 | France | 219/121 |

Primary Examiner—J. V. Truhe
Assistant Examiner—George A. Montanye
Attorneys—H. Hume Mathews, Edmund W. Bopp and Larry R. Cassett ABSTRACT: Arc-working apparatus with multiple current-carrying electrodes including in one embodiment a tungsten cathode-type arcing electrode, a workpiece, and a continuously fed hot wire electrode in electrical contact with the workpiece for depositing metal at the arc-heated area. Time-spaced current pulses for melting the contacting tip of the hot wire electrode alternate with time-spaced pulses of the arcing current for avoiding interaction of the respective pulsing magnetic fields and arc interference; in other embodiments more than two arcing electrodes and a common workpiece arc connected to current time-sharing circuits for avoiding magnetic field interaction and arc interference.

PATENTED DEC 14 1971

INVENTORS
NEIL J. NORMANDO
WILLIS C. PIERCE, JR.

BY *Larry R. Russell*
ATTORNEY

INVENTORS
NEIL J. NORMANDO
WILLIS C. PIERCE, JR.

BY *Larry R. Cassell*
ATTORNEY

AVOIDANCE OF CURRENT INTERFERENCE IN CONSUMABLE CONTACT HOT WIRE ARC WELDING

BACKGROUND OF THE INVENTION

This invention relates to electric arc-working systems having at least two coworking electrodes for depositing molten metal on a workpiece, such as for welding and for surfacing operations including cladding alloying, etc. A prior art welding system of this type, commonly referred to as "hot wire welding," consists of an arcing electrode, an independently heated, nonarcing, consumable wire electrode, and a workpiece common to both electrodes. The arcing electrode can be conveniently either nonconsumable, i.e. tungsten-inert gas (TIG) arc, or consumable, i.e., metal-inert gas (MIG) arc, depending for example, on the rate and characteristics of metal deposition desired. The hot wire electrode completes its heating circuit by making contact at its extension end with the arc-heated puddle on the workpiece. The heating current in this circuit is adjusted according to the wire electrode feed, for melting off without arcing, the extension tip coincident with deposition of the molten metal. A hot wire welding system of this character is described in the issue of "Welding Journal" for May 1968, pp. 386–393.

Another proposed multiple electrode arc working system comprises a plurality of aligned arcing electrodes, that are closely spaced for avoiding excess cooling of the work area and operate with short arcs of critical length with respect to electrode spacing for obtaining acceptable arc position stability. A system of this type having four arcing electrodes is described in "Welding Research Suppliment" for July 1965, pp. 327–s to 331–s.

In multiple-electrode arc-working systems, stable positioning of a working arc has presented serious problems due to arc interference by reacting magnetic forces within the system circuitry. Such interferences, evidenced by arc deflection, oscillation, etc., tends to enforce limits on the working currents, arc lengths, etc., thereby restricting the capability of the system. For example, where direct current is used in the respective electrode circuits, the corresponding magnetic fields tend to interact, especially at the region of electrode arcing near the workpiece, so as to deflect and lengthen the arc. Where alternating current is used, oscillation of the deflected arc occurs with the result, inter alia, that the arc heat is not fully concentrated within the intended working area.

The problem of such arc interference by magnetic forces has been previously recognized and various methods have been proposed for neutralizing or reducing the effect of the interacting magnetic fields on the arc. For example, in hot wire welding it has been proposed that an additional hot wire electrode be located alongside the first one, and that its current polarity with respect to that of the first be reserved for neutralizing the fields of both electrodes, insofar as the arc is concerned. However this may affect the arc, it creates new problems such as requiring balanced multiple feed and heating, and "loop effect" wherein magnetic forces in a loop circuit tend to expand the loop, i.e., spread apart the wire electrodes; as an alternative partial solution, it has also been proposed that arc interference be reduced by dephased AC current, or by certain combinations of electrode currents, and so tolerated within the limits achieved. In one such proposal, the current in the hot wire electrode is limited to a fraction of the arcing current. Although arc interference is reduced, the capability of the arc-working system for most efficient operation is also restricted.

The present invention is concerned with preventing arc interference in a multiple-electrode system of the character described above, and thereby improving and increasing the efficiency and capability of the system for depositing metal.

SUMMARY OF THE INVENTION

In accordance with the invention, arc interference in a multiple-electrode arc-working system as described above, is prevented by, in effect, time-sharing the system's electric power supply alternately back and forth between the circuit of one electrode and the circuit of another coworking and adjacent electrode, thereby avoiding coincidence of current in the two circuits. In other words, when current is flowing in one arcing electrode circuit, no current flows in the adjacent electrode circuit, and vice versa. The corresponding magnetic fields are therefore isolated in time from each other and so considered separately cannot affect position stability of the arc. By this method of eliminating arc interference, no limit is imposed on the magnitude or relative magnitude of current in either electrode circuit, except by factors other than those considered herein.

A principal object of the invention therefore is to provide an improved multiple-electrode arc-working system having increased efficiency and capability for metal deposition.

A related object is to provide an improved method of preventing arc interference in a high-speed multiple-electrode arc-working system for providing flexibility in the use and grouping of the electrodes.

Another related object is to provide an improved mulitple-electrode arc-working system wherein the working current of a consumable electrode can be at least equal to or greater than that of a closely adjacent electrode without arc interference, thereby providing freedom of choice in the use of consumable electrode current and larger wire diameters as well as low-resistivity wire such as aluminum or copper alloys for a given deposition rate of metal.

Another related object is to provide an improved arc-working system wherein the system's power supply is alternatively time-shared between individual electrode circuits for avoiding interaction of the magnetic fields of the respective circuits.

Other objects, features and advantages will appear from the following description with reference to the accompanying drawings.

DESCRIPTION OF THE PREFERRED EMBODIMENTS

Figure 1:
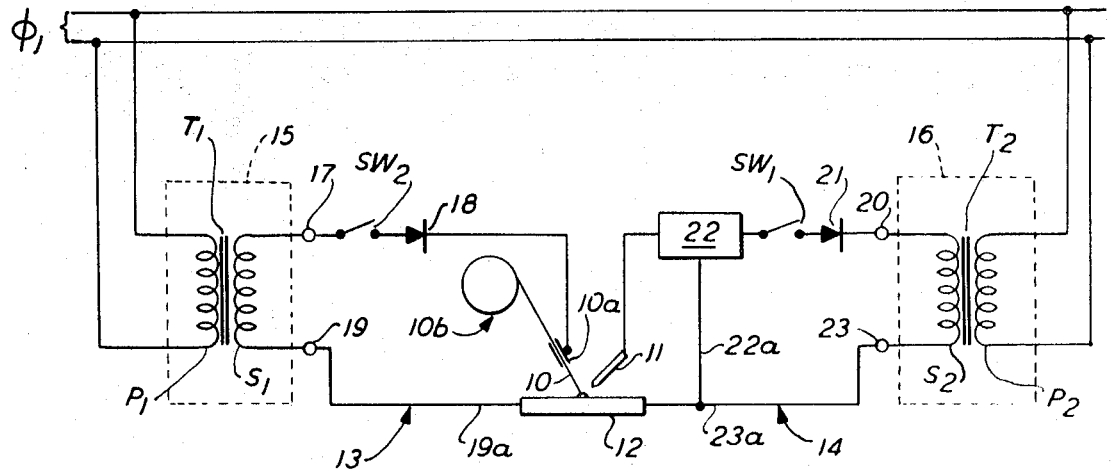
FIG. 1 is a system diagram illustrating circuitry for a two-electrode arc-working system embodying the present invention.

Referring to FIG. 1, an arc-working system embodying the invention comprises a pair of coworking electrodes 10 and 11 and a workpiece 12 common to both electrodes. The two electrodes are connected in separate circuits 13 and 14 for individual energization according to respective requirements, whereas the workpiece or coacting electrode 12 constitutes a junction connection between the circuits.

The power supply for the electrode circuit 13, as well as for the electrode circuit 14, may consist in each instance of a standard AC welding power unit generally indicated at 15 and 16, respectively, with conventional means for power output control. The supply for circuit 13 may alternatively be of the constant potential type. Each unit includes a single-phase transformer, $T_1$, $T_2$, respectively, having a primary winding, $P_1$, $P_2$, that may be energized from one phase of a three-phase, 60-cycle power main, and a secondary winding, $S_1$, $S_2$. The transformer primaries are conveniently connected to the same phase source for maintaining a synchronized in-phase relationship for the respective secondary currents. The electrode circuits 13 and 14 are energized from the transformer secondaries of units 15 and 16 respectively, for supplying time-shared power alternately to the electrodes 10 and 11.

The coworking electrode 11 in the circuit 14 is shown as of the TIG arc (tungsten) DC straight polarity type referred to above. In operation, the switch SW, is first closed and the resulting arc between the tungsten electrode and workpiece heats the workpiece and forms a puddle in preparation for deposit of the wire electrode metal. The arcing circuit 14 transmits time-spaced power pulses at line frequency (60 p.p.s.) to the arcing electrode 11. For this purpose, the transformer output terminal 20 of the power unit 16 is connected through a diode 21 and an oscillator unit 22 where used, to the electrode 11, and the other output terminal at 23 is directly connected by lead 23a to the workpiece. The oscillator unit 22 is of the well-known spark gap type and may be connected in the circuit and across the electrode arc gap by lead 22a as indicated, for initiating the tungsten electrode arc, as in some cases it may be found necessary for ensuring ionization of the gap at the start of each arc power pulse. The oscillator used herein is a standard spark gap HF oscillator commercially available as " Airco Model HF-15," and therefore requires no detailed description.

After initial heating of the work by the tungsten arc, the electrode circuit 13 is closed by switch SW$_2$, one terminal of the transformer secondary at 17 being connected through a diode 18 to the contact tube 10a of the electrode 10, and the other terminal at 19 being directly connected by lead 19a to the workpiece 12 for completing the circuit. The electrode 10 is consumable and in the present instance, constitutes a so-called "hot wire" that is normally in electrical contact at its extension end with the workpiece. The wire feed is schematically indicated at 10b. The circuit 13 supplies sufficient heating current for melting the extension or contact end without arcing, as explained above. In particular, the rectified current in circuit 13 consists of time-spaced unidirectional pulses having a frequency in the present instance of 60 p.p.s. The pulse current is adjusted according to the current required for proper heating of the hot wire electrode.

Inasmuch as arc working currents in present commercial applications are generally of high amperage, ranging to 200 and 300 amperes, it will be apparent that strong magnetic fields are produced around the closely positioned electrodes 10 and 11 when normal working currents flow in the respective circuits. As mentioned above, these magnetic fields if coincident in time, would interact and cause excessive arc interference, and this in turn, would tend adversely to affect weld quality, metal deposition, etc. Time sharing of the system power supply between the circuits 13 and 14 not only avoids such coincidence, but provides for independent supply of current to each circuit without limit insofar as arc interference by magnetic forces is concerned.

Assuming now, that the instantaneous polarity at the transformer output terminal 17 of power unit 15, and at the transformer output terminal 20 of power supply 16 is positive, it will be seen that the diode 18 passes a pulse of heating current through the circuit 13 including the hot wire electrode. At the same instant, the diode 21 is blocking flow of current 14 including the arcing electrode. As the polarity reverses and becomes negative, the diode 18 blocks flow of heating current in circuit 13, and the diode 21 passes a pulse of current for the arcing circuit 14. Accordingly, each electrode can be supplied with sufficient power for its operation function, while coincidence of currents in the respective circuits is avoided.

Although the use of means such as the spark gap oscillator 22, for ionizing the space between the TIG electrode 11 and workpiece following each arcing pulse is preferred, this device may in many instances be dispensed with. For example, the tungsten electrode itself may at high arcing currents constitute a sufficiently good hot cathode emitter for ensuring restarting of the arc at the next pulse; also a shorter time interval between the rectified pulses obtained by higher source frequency may be sufficient in itself when combined with TIG arcing.

Figure 2:
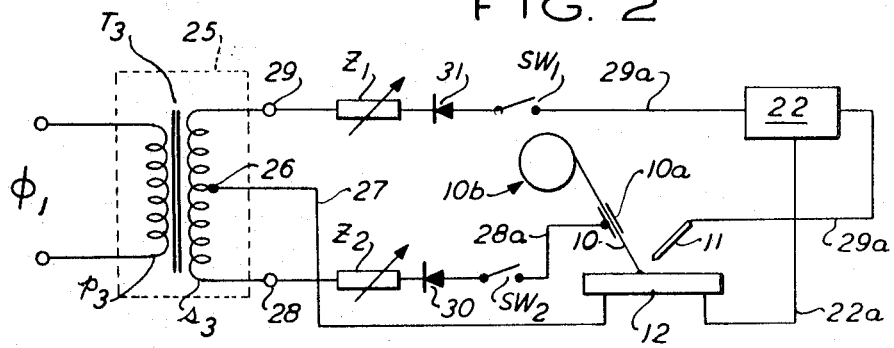
FIG. 2 is a similar diagram illustrating an alternative power supply for the system of FIG. 1.

As disclosed herein, time sharing, or alternate application, of the power supply between the circuits 13 and 14 is achieved by electronic switching wherein diodes are connected for proper polarity in the circuits, but is not limited to this example; obviously, other methods of switching and power sharing for alternate energization of the two electrode circuits are within the scope of the invention. For example, power-sharing circuitry as illustrated in FIG. 2 can conveniently by combined in one single-phase unit generally of the type used for battery chargers with full-wave rectification. In brief, the power supply unit 25 consists of a single-phase transformer T$_3$ with windings p$_3$ and s$_3$ wherein the secondary winding s$_3$ has a center tap 25 that is connected by a lead 27 to the workpiece 12. The opposite terminals 28 and 29 of the secondary are connected by lines 28a and 29a as shown, to the electrodes 10 and 11 respectively through diodes 30 and 31. Accordingly, each complete cycle of the AC supply is divided as two sequential pulses shared between the two electrodes, generally as described above.

Switches SW$_1$ and SW$_2$ are provided as in FIG. 1 for switching on the tungsten and hot wire electrode circuits; the respective working currents can be independently adjusted as required by suitable variable impedances indicated at Z and Z$_2$ respectively.

As in FIG. 1, a HF spark gap oscillator 22 can, where desirable, be connected to the arcing electrode line 29a and across the arc gap by line 22a for ensuring ionization at restart as described above.

Where, however, cyclic restart of the arc pulse is a primary factor, as with reverse polarity MIG arcing or as an alternative to HF oscillator interim ionization, a low-level DC "keep alive" current can be applied through the circuit 14 without affecting to any practical extent position stability of the main heating arc as described below with reference to FIG. 3.

Figure 3:
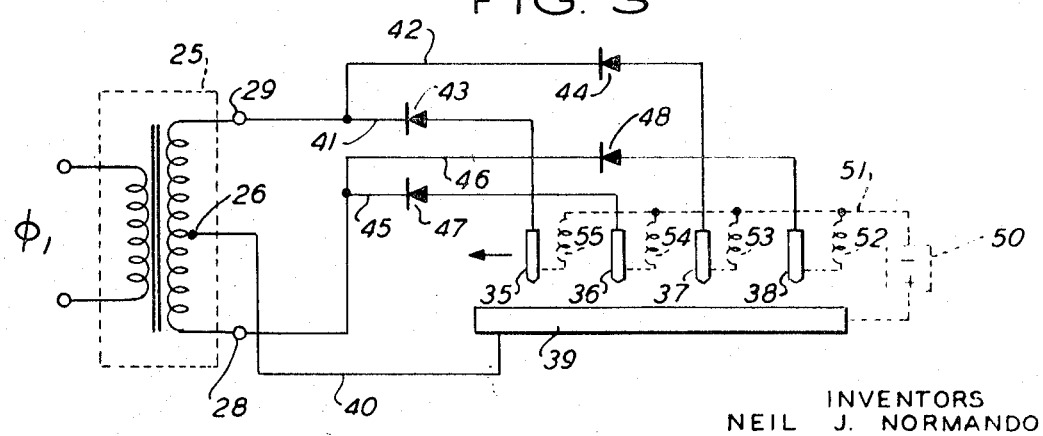
FIG. 3 is a system diagram illustrating another embodiment of the invention using mulitple arcing electrodes.

FIG. 3 shows a current time-sharing arrangement for precluding arc interference in a high-speed welding system having a plurality of TIG arcing electrodes 35, 36, 37, and 38. The electrodes in horizontal alignment, are suitably mounted on a carriage (not shown) for movement as a unit over a workpiece, as in the direction indicated, for applying arc heat to the work simultaneously at a number of contiguous or overlapping heat areas. The same arrangement has alternative application to MIG reverse polarity arcing electrodes where desired.

For obtaining the advantages of optimum arc length and current for a desired heating rate at the individual work areas, while providing proper horizontal spacing of the arcing electrodes for ensuring heat continuity throughout the elongated composite work area, the system current supply is shared between the pairs of electrodes 35, 37 and 36, 38, thereby avoiding to any significant extent interaction of the respective magnetic fields. In the example shown, the power supply 25 is the same as that of FIG. 2, and the transformer secondary with center tap 26 is connected to the workpiece 39 by line 40, the secondary also being connected at its terminals 28 and 29 through branch rectifier circuits to the pairs of electrodes, respectively. Specifically, terminal 29 is connected to the alternately spaced electrodes 35 and 37 through the branch circuits 41 and 42 that include diodes 43 and 44 respectively, and terminal 28 is connected to the other electrodes 36 and 38 through branch circuits 45 and 46 respectively, including the diodes 47 and 48. Accordingly, it is seen that the adjacent electrodes making up possible pairs, i.e., 35, 36 and 36, 37, and 37, 38, receive current pulses on a time-sharing basis as explained above, so that interaction of the respective magnetic fields cannot occur. Insofar as the simultaneously energized electrodes 35, 37 are consumed, the respective magnetic fields are sufficiently isolated by distance so that no significant interaction occurs; the same also applies to the electrodes 36, 38 that simultaneously arc on the following pulse from transformer terminal 28.

Where required, depending on the type of electrode, current intensity, etc., a small "keep alive" current as explained above, may be provided by a suitable DC source 50 of standard "drooper" type. For TIG electrodes, the source 50 is connected as indicated in FIG. 3, at its positive terminal to the workpiece and at its negative terminal by line 51 to the electrodes through parallel branches including suitable reactances, 52 to 55, respectively, tending to sustain the "keep alive" current. For MIG electrodes, the connections from source 50 are reversed.

The invention, by eliminating for all practical purposes arc interference between adjacent electrodes, therefore lends itself to greater freedom of design for increasing welding speed, etc., in arc working systems using closely grouped electrodes operating as a compact unit.

Figure 4:
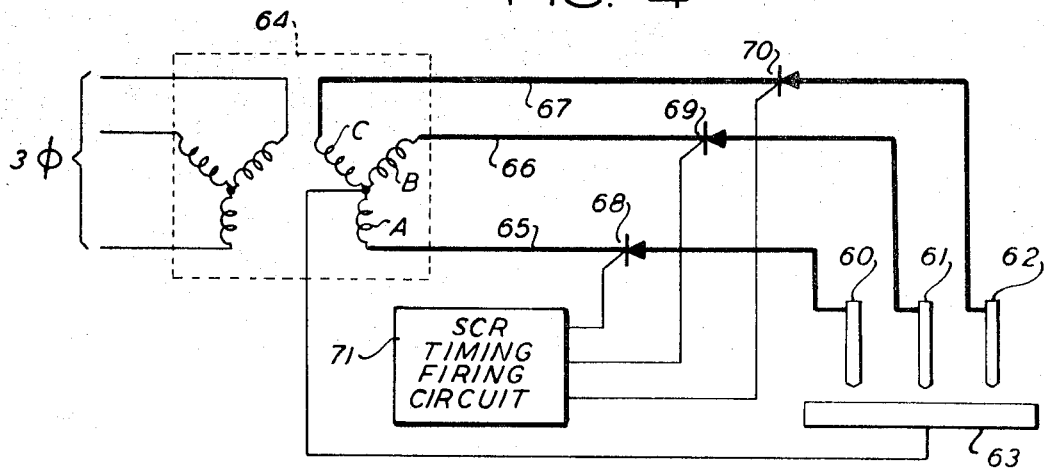
FIG. 4 illustrates a modified form of FIG. 3 with three-phase AC power supply.

In FIG. 4, an alternative arrangement for current time sharing is shown in a multiple-electrode system generally similar to that of FIG. 3. The electrodes 60, 61, and 62 are indicated as of reverse polarity, MIG type for example, and are mounted above the workpiece 63 as in FIG. 3. The electrode current is conveniently derived from a three-phase, 60-cycle AC supply 64, that is Y-connected as shown, with the secondary phase windings A, B, and C connected to electrodes 60, 61, and 62 respectively. The electrode supply connections 65, 66, and 67 include rectifiers 68, 69, and 70, preferably of the controlled rectifier type such as the silicon-controlled rectifier (SCR). The connections provide the usual reverse polarity for MIG arcs. Although but three electrodes are shown in the time-sharing arrangement of FIG. 4, it will be apparent that the number can be in multiples of three, with the multiple currents supplied by branch rectifier circuits as in FIG. 3.

Figure 5:
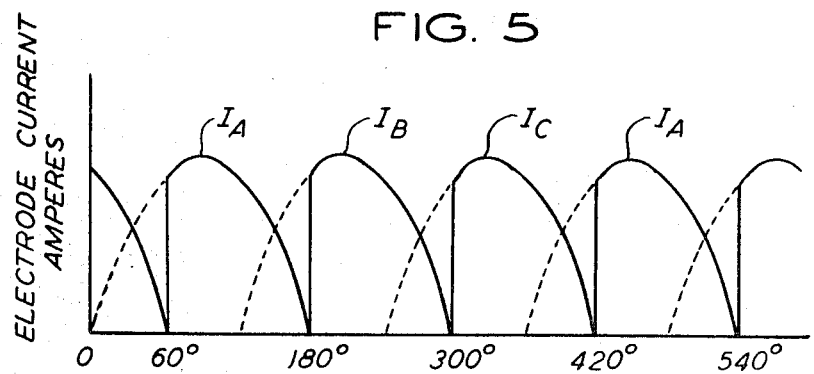
FIG. 5 graphically shows the three-phase pulsing sequence for the electrodes of FIG. 4, and FIG. 6 graphically shows the relation between hot wire current and rate of metal deposition for wire electrodes of different diameters in a system such as shown in FIGS. 1 and 2.

The electrode current time sharing for three-phase operation is best described graphically by reference to FIG. 5 wherein the electrode supply currents are plotted on a relative phase-time base. The phase currents $I_A$, $I_B$, and $I_C$ from the secondary windings A, B, and C respectively, are shown as displaced by 120°, with a comparatively small overlap of 60°. Assuming diodes are used in lieu of the SCR's in FIG. 4, a small amount of current overlap could occur, for example in the short period (60°) of coincident currents $I_A$ and $I_B$ in adjacent electrodes 60 and 61. In most instances this is not objectionable. However, in order to eliminate completely current overlap where such operation is preferred, the gate of each SCR is connected to a conventional timing-firing circuit 71 as indicated for delaying the start of each rectified pulse by 60°. The SCR control circuit 71 is synchronized in the usual manner with the supply source by connections (not shown) for firing and cutoff as indicated in FIG. 5.

For demonstrating practical aspects of the invention, laboratory tests using the system shown in FIG. 1 were made with two different wire electrodes having respective cross-sectional areas in approximately 2:1 ratio. These tests, listed in tables I and II below, represent satisfactory bead-on-plate working with one-half inch mild steel (MS) plate as base material, and with one-sixteenth inch diameter and 0.045-inch diameter MS wire electrodes, respectively. In all tests, a three-sixteenth inch diameter tungsten arcing electrode with 2 percent thorium, defined with the work plate a three-sixteenth to ¼-inch arc gap, and the hot wire electrode extension or "stickout" was 1 -9/16 inches. Both electrodes were provided with conventional gas shielding, a mixture of 75 percent helium and 25 percent argon being used for the tungsten electrode, and argon for the hot wire electrode.

TABLE I

| Test No. | Amperes Tungsten Electrode $I_T$ | Amperes 1/16" wire Electrode $T_W$ | Wire Metal Deposition Rate (lb./hr.) $W_M$ | $I_W/I_T$ % |
|---|---|---|---|---|
| 1 | 300 | 270 | 12 | 90 |
| 2 | 300 | 310 | 14 | 103 |
| 3 | 300 | 370 | 22 | 124 |
| 4 | 300 | 410 | 26 | 137 |

It will be seen from the tests above that the arcing current $I_T$ representing work heating was maintained constant, while the one-sixteenth inch hot wire electrode current was increased by steps to slightly more than 150 percent of the initial value. This was achieved without arc interference and resulted in increases up to well over 200 percent in feed and deposition rates, respectively, over the initial rates.

The ratio $I_W/I_T$ is especially significant here, as in the first tests it was started at 90 percent (which is 50 percent above the value suggested in prior hot wire practice) and was increased to 137 percent in test No. 4.

TABLE II

| Test No. | Amperes Tungsten Electrode $I_T$ | Amperes 0.045" Wire Electrode $I_W$ | Wire Metal Deposition Rate (lb./hr.) $W_M$ | $I_W/I_T$ % |
|---|---|---|---|---|
| 1 | 250 | 200 | 11 | 80 |
| 2 | 175 | 200 | 11.5 | 114 |

In the table II tests, wherein the 0.045-inch hot wire electrode has about half the cross-sectional area of the 1/16-inch wire of table I, it is at once apparent that the invention advantageously lends itself to the larger (and more economical) wire electrode. Where the smaller wire is preferred, the $I_W/I_T$ ratio can be readily be increased to 114 percent without arc interference. In other words, the invention provides for a higher wire current, even for a small diameter wire, than in prior practice.

Figure 6:
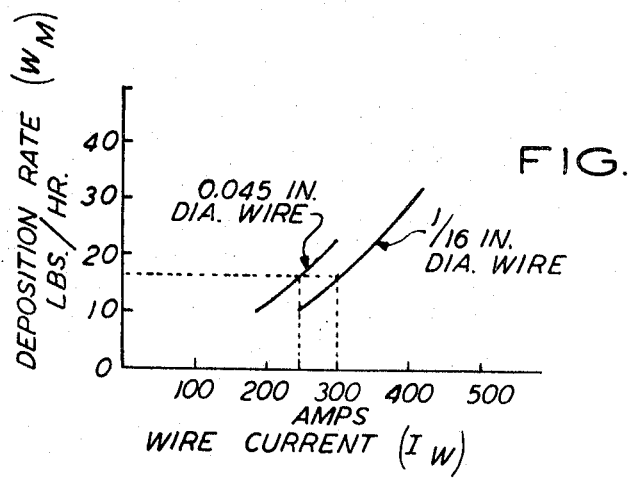

This advantage of the invention in allowing use of higher hot wire currents is graphically shown in FIG. 6, where the respective curves for the 0.045-inch and one-sixteenth inch diameter wires represent the relation between $I_W$ to $W_M$. Where the 1/16-inch wire electrode is preferred for a given metal deposition, the higher melting currents characteristic of larger electrode cross-sectional areas, can be used without limitations of arc interference.

Summarizing relevant factors relating to metal deposition in practicing the invention, the deposition rate is limited only by the allowable heat input to the work. Where high deposition rates are desired, the work heat from a high-current arc can be spread over a wider band, as by lateral mechanical oscillation of the welding torch, for increasing the heated work area and hence capability for greater metal deposition.

As used herein, the term "working current" means either electrode heating or arcing current; and the term "adjacent electrode(s)" means an electrode(s) in such close relation to an adjoining electrode(s) that interaction of the respective magnetic fields of coincident electrode currents would be sufficiently strong to cause significant arc interference.

Having set forth the invention in what is considered to be the best embodiment thereof, it will be understood that changes may be made in method and apparatus as above set forth without departing from the spirit of the invention or exceeding the scope thereof as defined in the following claims.

I claim:

1. An arc-welding system for welding a workpiece comprising a nonconsumable electrode, a consumable wire electrode in physical contact with said workpiece, arc-supporting pulsed-current power supply means connected in series circuit with said nonconsumable electrode and workpiece, additional pulsed-current power supply means connected in series circuit with said wire electrode and workpiece, said two power supply means being energized simultaneously and having their outputs arranged such that the current pulses from the two power supply means are supplied alternately to the two electrodes whereby interaction between the currents from the power supply means is reduced substantially below that which would occur between DC currents of the same average valve as that of said pulsed currents.

2. Arc-welding apparatus according to claim 1 wherein said arc-supporting power supply means and said additional power supply means comprise half-wave rectified single-phase power sources.

3. Arc-welding apparatus according to claim 2 wherein said power sources have a common primary transformer winding adapted for connection to an AC power source and a secondary winding with a tap thereon connected to the workpiece, and each end of said secondary connected to one of said electrodes.

4. In an electric arc welding process wherein an electric arc is maintained between a nonconsumable electrode and a workpiece and a separate current is caused to flow through a wire electrode continuously fed into the molten pool created by the heat of said arc, the method of eliminating interaction between said currents comprising periodically pulsing the current in said arc, periodically pulsing the current in said wire electrode and timing said pulsed currents to eliminate coincidence of pulses of currents in said electrodes whereby interaction between the currents is reduced substantially below that which would occur between DC currents of the same average valve as that of said pulsed currents.

* * * * *

UNITED STATES PATENT OFFICE
CERTIFICATE OF CORRECTION

Patent No. 3,627,974          Dated December 14, 1971

Inventor(s) Neil J. Normando and Willis C. Pierce, Jr.

It is certified that error appears in the above-identified patent and that said Letters Patent are hereby corrected as shown below:

Column 1, line 31, "Suppliment" should be --Supplement--
Column 1, line 36, "interferences" should be --interference--
Column 1, line 44, "inter alia" should be underlined
Column 1, line 53, "reserved" should be --reversed--
Column 3, line 56, "supply" should be --unit--
Column 3, line 59, after "current" the words --in circuit-- were omitted
Column 3, line 64, "operation" should be --operating--
Column 4, line 23, "Z" (first instance) should be --$Z_1$--
Column 5, Table 1  Second column should be entitled --Amperes Tungsten Electrode $I_T$ --

Third Column should be entitled --Amperes 1/16' wire Electrode $I_W$ --

Signed and sealed this 4th day of July 1972.

(SEAL)
Attest:

EDWARD M. FLETCHER, JR.          ROBERT GOTTSCHALK
Attesting Officer                Commissioner of Patents